United States Patent [19]
Agrotis et al.

[11] Patent Number: 5,453,676
[45] Date of Patent: Sep. 26, 1995

[54] TRAINABLE DRIVE SYSTEM FOR A WINDSHIELD WIPER

[75] Inventors: Demetris A. Agrotis, Spring Valley, Ohio; Marc J. Georgin, Nogent Sur Marne, France

[73] Assignee: ITT Automotive Electrical Systems, Inc., Auburn Hills, Mich.

[21] Appl. No.: 315,427

[22] Filed: Sep. 30, 1994

[51] Int. Cl.⁶ .................. H02P 3/00; B60S 1/08
[52] U.S. Cl. ............. 318/643; 318/444; 318/483; 318/568.1; 318/443
[58] Field of Search .................. 318/440–469, 318/560–649; 364/424.02; 395/2.68

[56] References Cited

U.S. PATENT DOCUMENTS

| | | | |
|---|---|---|---|
| 4,431,954 | 2/1984 | Carpenter et al. | 318/443 |
| 4,492,904 | 1/1985 | Graham | 318/444 |
| 4,620,141 | 10/1986 | McCumber et al. | 318/483 |
| 4,916,374 | 4/1990 | Schierbeek et al. | 318/483 |
| 4,942,349 | 7/1990 | Millerd et al. | 318/483 |
| 4,960,996 | 10/1990 | Hochstein | 250/349 |
| 4,965,725 | 10/1990 | Rutemberg | 364/413.1 |
| 5,057,754 | 10/1991 | Bell | 318/483 |
| 5,059,877 | 10/1991 | Teder | 318/444 |
| 5,262,640 | 11/1993 | Purvis et al. | 250/227.25 |
| 5,302,007 | 4/1994 | Morita et al. | 303/9.73 |
| 5,306,992 | 4/1994 | Dröge | 318/483 |

*Primary Examiner*—Paul Ip
*Attorney, Agent, or Firm*—Biebel & French

[57] ABSTRACT

A neural network provides automatic control of a windshield wiper. A rain sensor generates sensing signals indicating a rain pattern, and the neural network generates wiping demand signals indicating a wiping action desired by the driver. A training unit uses manually generated wiping supervision signals to create weight factors for the neural network.

10 Claims, 2 Drawing Sheets

TRAINABLE DRIVE SYSTEM FOR A WINDSHIELD WIPER

BACKGROUND OF THE INVENTION

This invention relates to the field of driving controls for windshield wipers. A large variety of prior art windshield wiper controllers are available for use in operating motor vehicles throughout a wide range of inclement weather conditions. These controllers typically have manually actuated switches for selection of 2 or 3 different wiping speeds, as well as a variably timed intermittent mode. Variable wiping patterns are also available.

One of the problems with windshield wipers arises from the fact that they may require frequent operator adjustment with changing precipitation conditions and changing vehicle speeds often times encountered on the highway. For this reason there has been a great deal of interest in controllers equipped with rain sensors and able to effect automatic adjustment of the wiping operation based upon measured precipitation. Here again there is a great diversity of available equipment. For instance there are adaptive, microprocessor controlled systems, as taught in Schierbeek et al U.S. Pat. No. 4,916,374 and in Teder U.S. Pat. No. 5,059,877. Another system, disclosed in Graham U.S. Pat. No. 4,492,904 features a touch control allowing an operator to set a delay time by means of two consecutive touches.

While recent developments have done much to address the variability of weather conditions, their configurations are fixed by judgments made by design engineers. However, each human operator is unique and has specific needs depending upon his or her eyesight, reaction time and driving style. Thus an automatic control system, even though adaptive, may achieve theoretically "ideal" performance and yet not be ideal in the mind of the driver who is putting money and life on the line. As a consequence, drivers still are faced with frequent adjustment of their windshield wiper controls at the very time when their attention is required elsewhere.

It is therefore seen that there is a need for an improved windshield wiper control system which may be adjusted to meet the particular requirements of a specific driver and which, upon adjustment, requires little or no further adjusting. It is an object of this invention to fulfill that need.

SUMMARY OF THE INVENTION

This invention provides an apparatus and method for customizing the operation of a windshield wiper to meet the specific tastes of one or more identified drivers. A rain sensor generates a sensing signal related to the pattern of rain striking the windshield and therefore indicating a particular wiping requirement. This signal is digitized and applied to a neural network.

The neural network generates a wiping demand signal based upon weight factors established by a training unit. There also is a manual adjustment unit which generates a wiping supervision signal in accordance with a manual input from a human operator.

Preferably there is a switch which is connected for receiving both the wiping demand signal and the wiping supervision signal and selectively delivering one or the other to a motor controller. The motor controller then controls the operation of a wiper drive motor in accordance with the output from the switch.

There is a training unit which receives the sensing signal and sets the weight factors in the neural network so as to cause the wiping demand signal to correspond to the wiping supervision signal for like rain conditions. Preferably the weight factors are set initially at standard values and are adjusted by the training unit upon consideration of differences between wiping supervision signals and concurrently generated wiping demand signals for a series of different rain conditions.

Preferably there is a driver identification unit which identifies the driver who generates a particular wiping supervision signal. A preprocessor processes the rain sensing signal prior to application to the neural network and preferably inserts a driver identification code, as supplied by the driver identification unit. Thus the neural network may demand a switch from low speed wiping to high speed wiping at rain conditions previously specified by the particular driver who happens to be at the wheel.

The trainable control system of this invention economizes significantly in cost by use of binary inputs and outputs from all nodes. Due to the binary nature of the nodal input signals, weighted multiplication thereof may be accomplished by selective addition of the weight factors. Once the selected weight factors have been summed, the resulting total is compared with a predetermined threshold to create a binary output.

DESCRIPTION OF THE PREFERRED EMBODIMENT

Figure 1:
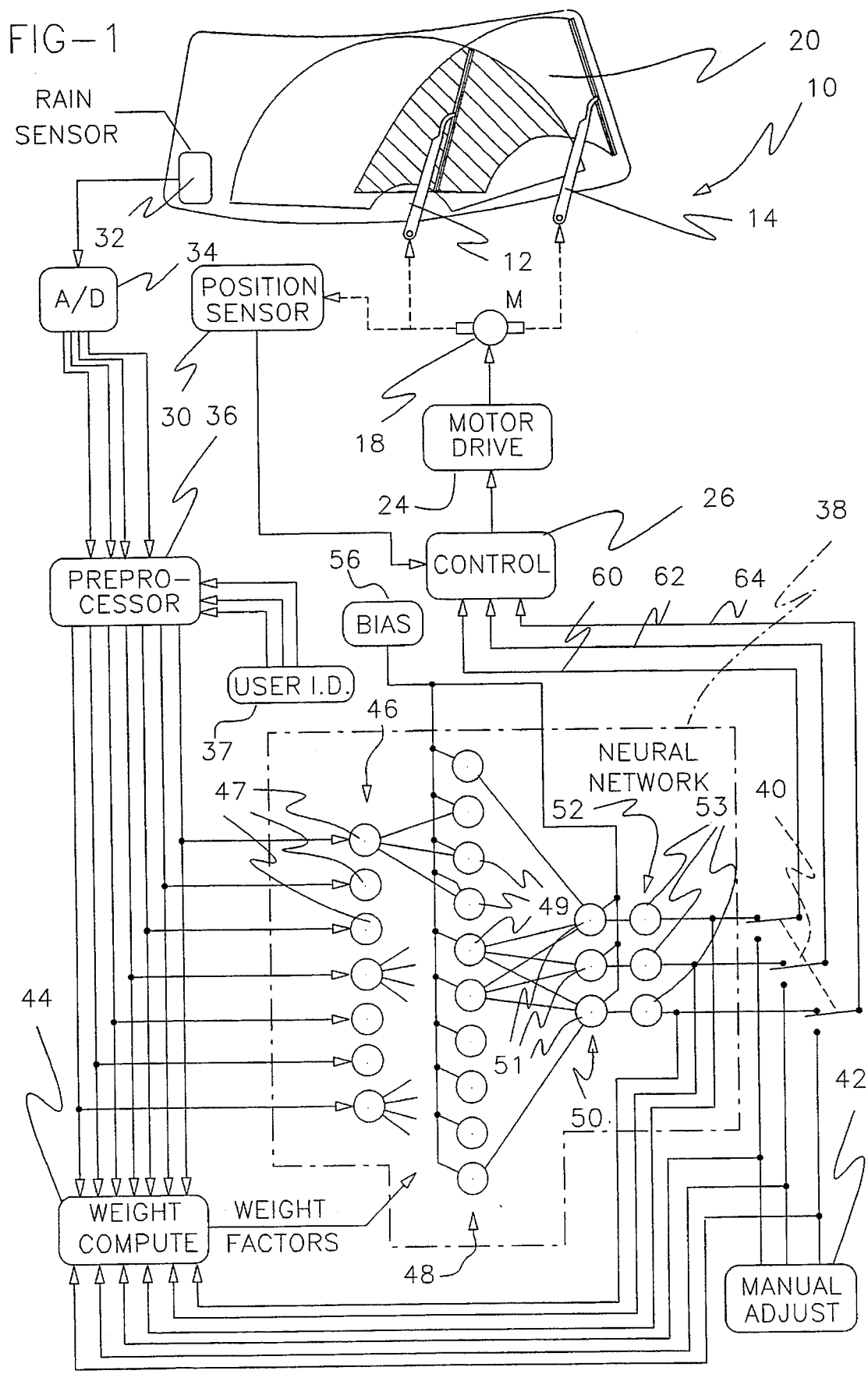
FIG. 1 is a schematic illustration of a windshield wiper control system in accordance with the present invention.

Referring to FIG. 1 there is illustrated a windshield wiper control system 10 connected for controlling a drive motors 18 to drive a pair of windshield wipers 12, 14 for wiping a windshield 20. Drive motor 18 is powered by a drive unit 24 under control of a controller 26. A position sensor 30 provides position feedback to controller 26. Wipers 12, 14, motor 18, drive unit 24, position sensor 30 and controller 26 are all of conventional design.

Controller 26 may have its own microprocessor (not illustrated) which may function in a manner well known in the art. For a teaching in this regard reference may be made to Carpenter et al. U.S. Pat. No. 4,431,954.

Prior art controllers, such as controller 26 regulate windshield wiper speed in response to manually actuated switch settings. Those switches are replaced in the present invention by a switch 40 connected to the output of a neural network 38.

Switch 40 selectively applies to controller 26 either wiping demand signals from neural network 38 or wiping supervision signals from a manual adjustment device 42. Switch 40 is connected to controller 26 by a plurality of lines 60, 62, 64 which signal commands for different predetermined speeds. In a two-speed system a high speed command may be signalled by a HI on line 60. A low speed command may be signalled by a HI on line 62, while a HI on line 64 may signal an error condition. Preferably controller 26 defaults to high speed when line 64 goes HI. Lines 60, 62, 64 are selected for activation based upon rain conditions as sensed by a rain sensor 32.

Rain sensor 32 is a window mounted unit which may comprise a first set of light pipes for illuminating the windshield and a second set of light pipes for transmitting reflected light to a series of photodetectors. Details of such a rain sensor 32 are taught in Purvis et al. U.S. Pat. No. 5,262,640.

Preferably, rain sensor 32 is a conventional video raster scanner (not illustrated) comprising a CCD array. Such a scanner may image a small area of the windshield and generate gray scale information in analog form for a two-dimensional array of closely spaced pixels. Other types of rain sensors may also be used.

Sensing signals from rain sensor 32 are digitized by an A/D converter 34 and applied to a preprocessor 36. Preprocessor 36 performs a statistical analysis of the data received from A/D converter 34 to determine a series of parameters such as drop size, drop distribution and percent of coverage.

Preferably preprocessor 36 generates a 4-bit binary code indicating an areawise percent of drop coverage, together with a 3-bit code identifying the driver (seven bits total). The driver identification code may be supplied manually by a switch or other suitable encoding device 37. The identification code enables adaptive use of the system by as many as eight drivers. More drivers may be accommodated by a longer code and a correspondingly larger neural network 38.

Preprocessor 36 may comprise a programmed microprocessor, or a neural network. Reference may be made to Rutenberg U.S. Pat. No. 4,965,725 for a teaching on the use of a neural network to process information received from an optical scanner.

Output signals from preprocessor 36 are applied to neural network 38 which may comprise an input layer 46 having nodes 47, a first hidden layer 48 of nodes 49, a second hidden layer 50 of nodes 51 and an output layer 52 of nodes 53. Each node in each of the hidden layers is connected to all of the nodes in adjacent layers. For simplicity of illustration only representative connections are shown in FIG. 1.

Each of the nodes in the hidden layers 48, 50 has a plurality of stored weight factors, one for each connection on its input side. These weight factors are established under the control of a training unit 44, which may be a programmed microprocessor or another neural network.

When switch 40 is in the position illustrated in FIG. 1, control unit 26 operates under feedback control from rain sensor 32. In this mode the 7-bit binary output code from preprocessor 36 is applied to input layer 47 of neural network 38 and mapped to output layer 52 by the weighted nodes 49, 51 of hidden layers 48, 50. The weighting is chosen to select the wiper speed which would be preferred by the identified driver under the rain conditions being reported by preprocessor 36. The nodes 53 of output layer 52 are connected for delivery of wiping demand signals to motor control lines 60,62,64 via switch 40.

When switch 40 is in the alternative (non-illustrated) position, training unit 44 compares the motor speed selection generated by neural network 38 with a wiping supervision signal, or desired speed, as indicated by the setting of manual adjustment unit 42. Training unit 44 adjusts the weight factors so as to bring the output of neural network 38 into correspondence with the wiping supervision signal from manual adjustment unit 42 for the particular rain condition being sensed. Appropriate weight factor selection may be achieved by back propagation of the observed error. Algorithms for that purpose are well known. Reference may be made to a text entitled "Neural Networks and Fuzzy Systems" edited by Bart Kosko, published by Prentice Hall, 1992, and to other references mentioned therein, for teachings on the training of a neural network by back propagation.

Initial selection of nodal weight factors may be made with the assistance of a fuzzy logic controller. Alternatively, initial weight factors may be selected arbitrarily and thereafter be refined by training. It is anticipated that initial setting of weight factors will reflect the mean results of adjustments performed by a number of test drivers at a factory location. Following delivery, the owner of the windshield wiper control system will make additional corrective adjustments as desired.

In order to minimize system costs it is desirable to implement the controller logic with a minimum number of neural network hidden layers and nodes. It has been found that a minimized implementation may be obtained through use of binary controlled multi-valued threshold logic. All of the inputs to nodes 47 of input layer 46 have binary values of either zero or one. These values are passed to nodes 49 of first hidden layer 48.

Each of nodes 49 receives an input from each node 47 and a bias input from bias unit 56. The bias input is uniformly set at 1. Conventional feed forward neural network implementation would require each node 49 to multiply each of its inputs by a specially selected weight factor and then sum the products. This calls for extensive, and costly, parallel processing circuitry. That can be eliminated in the above-described embodiment of this invention.

As previously stated, all of the inputs to nodes 47 of input layer 46 are constrained to have values of either 0 or 1. These values (and a bias value of 1) are passed on to hidden layer 48. It will be appreciated that multiplication by either 0 or 1 is a trivial task. Each node 49 simply ignores its 0 inputs and sums the weight factors for those input terminals which receive a value of 1. The sum for each node 47 is threshold adjusted to 0 or 1 and passed on to each node 51 of the second hidden layer 52. Nodes 51 operate in the same fashion as nodes 49 and likewise receive a bias input of 1 from unit 56. As a consequence the neural network may be implemented by a few inexpensive shift registers and a modest amount of non-volatile RAM.

Figure 2:
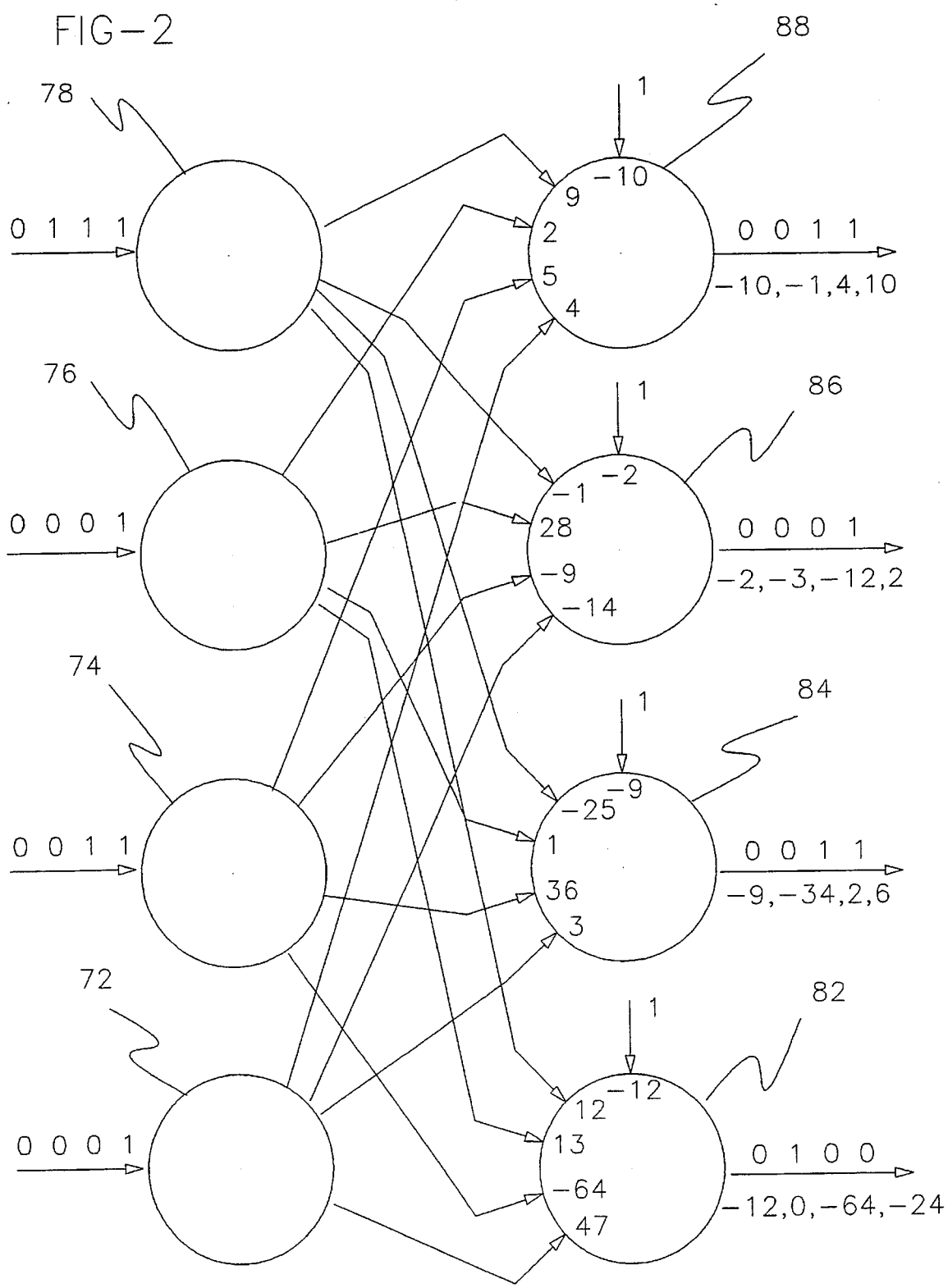
FIG. 2 is a schematic illustration of a binarily operated neural network.

In general a weighting arrangement can be found for a simplified multi-threshold binary system which will transform an arbitrarily specified set of binary inputs into a desired set of binary outputs. By way of example, Table I sets forth a set of training data for a set of 4 hidden layer nodes 82,84,86,88 as illustrated in FIG. 2. The training data are binary bits which may relate to arbitrary input and output functions.

Referring now to FIG. 2, four input nodes 72, 74, 76, 78 are connected to the four hidden layer nodes 82, 84, 86, 88. Nodes 82, 84, 86, 88 have a bias input which is set at a fixed value of 1. Nodes 82, 84, 86, 88 effectively multiply their bias inputs by weighing factors of −12, −9, −2 and −10 respectively. Weight factors for the inputs from nodes 72, 74, 76, 78 are indicated on the figure. These weights transform the training inputs of Table I into the specified outputs.

FIG. 2 illustrates a sample timed sequence (reading from right to left) of binary inputs to each of the four input nodes and the resulting sequence of binary outputs from the four hidden layer nodes. The sequence of output values prior to thresholding is also illustrated. Thus when the values 1, 1, 1, 1 are applied simultaneously to input nodes 72, 74, 76, 78, hidden layer nodes 82, 84, 86, 88 produce simultaneous product values of −24, 6, 2, 10 respectively. These values are compared against a threshold value of zero to produce respective simultaneous binary outputs of 0, 1, 1, 1.

Due to the simplifications introduced by the above described binary thresholding technique, it becomes feasible to implement a neural network for a windshield wiper controller with a simple arrangement of 13 hidden-layer nodes as illustrated in FIG. 1. Such an arrangement may be implemented in a programmed microprocessor of conventional design. A typical set of weights for the ten nodes of layer 48 and the three nodes of layer 50 are set forth in Table II. These weights were established from a set of typical training data and will transform three bits of operator identification data and four bits of rain coverage data into 3-bit output codes corresponding to the particular training data which were used.

The above-described embodiment of the invention trains the neural network through the use of differences between concurrently generated wiping demand signals and wiping supervision signals. However, the operator can see the wiping action in progress and could generate wiping supervision signals which could supply all of the feedback information required by training unit 44. Such an arrangement would not need feedback copies of the wiping demand signals. Also switch 40 is optional, as wiping supervision signals need not be sent directly to motor controller 26.

TABLE I

TRAINING DATA FOR FOUR-HIDDEN-NODE ARRANGEMENT

| Inputs | | | | Outputs | | | |
|---|---|---|---|---|---|---|---|
| 1 | 2 | 3 | 4 | 1 | 2 | 3 | 4 |
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 1 | 0 |
| 0 | 0 | 1 | 1 | 1 | 0 | 1 | 0 |
| 0 | 1 | 0 | 0 | 0 | 1 | 0 | 1 |
| 0 | 1 | 0 | 1 | 0 | 1 | 0 | 1 |
| 0 | 1 | 1 | 0 | 0 | 1 | 1 | 0 |
| 0 | 1 | 1 | 1 | 1 | 1 | 1 | 0 |
| 1 | 0 | 0 | 0 | 0 | 0 | 0 | 1 |
| 1 | 0 | 0 | 1 | 1 | 0 | 0 | 1 |
| 1 | 0 | 1 | 0 | 1 | 0 | 1 | 0 |
| 1 | 0 | 1 | 1 | 1 | 0 | 1 | 0 |
| 1 | 1 | 0 | 0 | 1 | 1 | 0 | 1 |
| 1 | 1 | 0 | 1 | 1 | 1 | 0 | 1 |
| 1 | 1 | 1 | 0 | 1 | 1 | 1 | 0 |
| 1 | 1 | 1 | 1 | 1 | 1 | 1 | 0 |

TABLE II

WEIGHT DATA FOR NODES IN 1ST HIDDEN LAYER; BIAS LAST (1) 3.891, 2.104, .788, −4.837, 3.896, 1.928, 7.999, −2.986
(2) −.587, −2.403, −3.174, .909, 1.354, .815, .720, 1.603
(3) −2.455, −6.801, −8, .181, 4.485, 2.501, 2.406, −.357
(4) 3.601, 1.466, −.039, .132, 3.299, 1.774, 3.385, −6.201
(5) −6.469, −5.593, −6.942, −4.476, −4.134, −3.679, 1.356, −.26
(6) −3.66, −.811, −1.927, −1.709, −3.441, −3.022, 3.11, 4.785
(7) 2.186, 2.258, 1.863, −1.17, −2.719, .2, 1.979, −2.507
(8) −7.136, −4.463, −1.781, −4.506, −3.047, −1.763, 2.393, −.508
(9) −4.776, −7.93, −8, −.809, 1.224, .74, 1.134, 2.166
(10) −5.903, −5.057, 3.444, .837, −1.537, −3.992, −2.925, −.738

WEIGHT DATA FOR NODES IN 2ND HIDDEN LAYER; BIAS LAST (1) −5.737, 2.438, −3.106, −1.889, −4.122, −5.567

TABLE II-continued 1.835, −4.838, −3.235, −4.852, .934
(2) 3.185, −1.175, 2.404, 6.477, −7.722, −3.579
−3.532, −6.254, 1.673, −4.002, −2.935
(3) 2.638, −4.276, −7.209, 2.199, −6.173, −5.446
4.555, −3.556, −7.491, −1.816, 1.57

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An automatic drive system for a windshield wiper comprising:

(a) rain sensing means for generating sensing signals indicating rain distribution on a windshield, (b) A neural network for using a plurality of weight factors to convert said sensing signals into wiping demand signals;

(c) a motor responsive to said wiping demand signals for driving said windshield wiper;

(d) manual adjustment means for generating wiping supervision signals; and (e) training means connected for receiving said sensing signals and said wiping supervision signals and responsive thereto by generating said weight factors.

2. An automatic drive system for a windshield wiper comprising:

(a) rain sensing means for generating a sensing signal indicating a rain condition on a windshield;

(b) means for generating an identification signal indicating a particular human operator;

(c) demand means conditioned by training information to respond to said sensing signal and said identification signal by generating a wiping demand signal indicating a wiping action expected to be desired by said human operator for said rain condition;

(d) a motor responsive to said wiping demand signal for driving said windshield wiper; and (e) training means connected for enabling said human operator to supply said training information to said demand means.

3. A control system for a windshield wiper comprising:

(a) rain sensing means for generating sensing signals indicating rain distribution on a windshield, (b) network means alterable to a multiplicity of different operating states and connected for receiving said sensing signals and responding thereto by generating wiping demand signals, said wiping demand signals being adaptively correctable by changes in said operating states, (c) manual adjustment means for generating wiping supervision signals, (d) control means connected to a switching output terminal and responsive to signals thereon for controlling said windshield wiper, (e) switching means connected for selective, alternative transfer of said wiping demand signals and said wiping supervision signals to said switching output terminal, and (f) training means connected for receiving said sensing signals, said wiping demand signals and said wiping supervision signals and responsive thereto by causing corrective changes in said operating state.

4. A control system according to claim 3 wherein said rain sensing means comprises means for generating said sensing signals in a binary format, and said network means comprising node means configured for summing weight factors selected from among a group of said weight factors in accordance with binary states of said sensing signals.

5. A control system according to claim 4 wherein said training means comprises means responsive to said wiping demand signals and said wiping supervision signals for generating said weight factors.

6. A control system according to claim 5 wherein said rain sensing means comprises means for coding said sensing signals to identify a specified human operator.

7. A control system for a windshield wiper comprising:

(a) rain sensing means for generating a sensing signal indicating rain distribution on a windshield;

(b) preprocessing means for processing said sensing signal and generating a corresponding plurality of binary coded input signals;

(c) an input layer comprising a plurality of input nodes, each said input node being connected for receiving one of said binarily coded input signals and, generating parallel copies thereof;

(d) a hidden layer comprising a plurality of hidden nodes, each said hidden node having a plurality of stored weight factors and being connected for receiving one of said parallel copies from each of a plurality of said input nodes, associating one of said weight factors with each said one of said parallel copies, creating a total by summing those of said weight factors which are associated with ones of said parallel copies having a predetermined binary state, and creating a binary output signal by comparing said total against a predetermined threshold value;

(e) output means for receiving a said binary output signal from a plurality of said hidden nodes and generating a corresponding wiping demand signal;

(f) control means responsive to said wiping demand signals for controlling the operation of said windshield wiper;

(g) manual adjustment means for generating wiping supervision signals in response to manual adjustment by a human operator; and (h) training means connected for adjusting said weight factors in response to said binarily coded input signals and said wiping supervision signals.

8. Control apparatus according to claim 7 wherein said training means comprises means for adjusting said weight factors in accordance with differences between said wiping supervision signals and said wiping demand signals.

9. Control apparatus according to claim 8 wherein said output means comprises a second said hidden layer having second hidden nodes each connected for receiving a said binary output signal from a plurality of said first mentioned hidden nodes and generating said wiping demand signal therefrom, and a layer of output nodes for relaying said wiping demand signal to said control means.

10. Method of generating a control signal for an electric motor comprising the steps of:

(1) sensing a condition to be corrected by said electric motor and generating a sensing signal indicating the severity of said condition;

(2) converting said sensing signal into a binary code comprising a plurality of binary bits;

(3) using said binary bits to set voltage states on a plurality of parallel lines;

(4) connecting each of said parallel lines to each of a plurality of hidden nodes in a neural network;

(5) supplying a weight factor to each of said hidden nodes for each said parallel lines connected thereto;

(6) supplying a bias weight to each of said hidden nodes;

(7) causing each of said hidden nodes to perform a weighted multiplication by calculating a sum for its said bias weight and those of its said weight factors associated with a said parallel line which is set to a predetermined voltage state;

(8) causing each said hidden node to generate a binary output bit by comparing its said sum against a predetermined threshold value; and (9) generating said control signal by combining binary output bits from said hidden nodes.

* * * * *